United States Patent
Hsu

(10) Patent No.: US 11,241,982 B2
(45) Date of Patent: Feb. 8, 2022

(54) WALKING INFANT SEAT

(71) Applicant: HONDA MOTOR CO., LTD., Tokyo (JP)

(72) Inventor: Ricky Jukuei Hsu, Rancho Palos Verdes, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 412 days.

(21) Appl. No.: 16/457,708

(22) Filed: Jun. 28, 2019

(65) Prior Publication Data
US 2020/0406792 A1 Dec. 31, 2020

(51) Int. Cl.
*B60N 2/26* (2006.01)
*B60N 2/28* (2006.01)
*B62D 57/032* (2006.01)
*G05D 1/02* (2020.01)

(52) U.S. Cl.
CPC ......... *B60N 2/2848* (2013.01); *B60N 2/2812* (2013.01); *B62D 57/032* (2013.01); *G05D 1/0221* (2013.01)

(58) Field of Classification Search
USPC ................................ 700/245–264; 701/23–28
See application file for complete search history.

(56) References Cited

U.S. PATENT DOCUMENTS

| | | | | |
|---|---|---|---|---|
| 4,989,888 A | * | 2/1991 | Qureshi | B60N 2/2848 280/30 |
| 5,739,655 A | * | 4/1998 | Torii | B62D 57/00 180/8.6 |
| 6,237,995 B1 | * | 5/2001 | Dierickx | B60N 2/2848 280/648 |
| 6,364,040 B1 | * | 4/2002 | Klann | A63H 11/00 180/8.1 |
| 7,348,747 B1 | * | 3/2008 | Theobold | B25J 5/005 318/568.11 |

(Continued)

FOREIGN PATENT DOCUMENTS

| | | | |
|---|---|---|---|
| DE | 10008230 A1 | 9/2001 | |
| GB | 2429401 A | * 2/2007 | ........... B60N 2/2875 |

OTHER PUBLICATIONS

"5 in 1 Sit 'n' Stroll Elite Car seat/Stroller + Sunshade", http://lillygold.com/product/featured-product/5-in-1-sit-n-stroll-elite/, p. 5.

*Primary Examiner* — Jonathan L Sample
(74) *Attorney, Agent, or Firm* — Arent Fox LLP

(57) ABSTRACT

The disclosure provides an infant vehicle seat that is capable of independent movement. The infant vehicle seat may include a base including a shell enclosing a seating area and an infant restraint harness. The infant vehicle seat may include four legs, each pivotably mounted to the base and including a joint between an upper segment and a lower segment. The infant vehicle seat may include a first actuator for each leg coupled with the base and the respective upper segment and configured to pivot the leg with respect to the base. The infant vehicle seat may include a second actuator for each leg coupled with the upper segment and the lower segment and configured to bend and extend the leg. The infant vehicle seat may include a control system configured to translate an input command into a series of control signals for each of the first actuators and second actuators.

20 Claims, 5 Drawing Sheets

(56) References Cited

U.S. PATENT DOCUMENTS

| | | | |
|---|---|---|---|
| 8,998,242 B2 | 4/2015 | Wang | |
| 9,108,654 B2 * | 8/2015 | Kozinski | B62B 7/006 |
| 9,260,039 B1 * | 2/2016 | Satterfield | B60N 2/2821 |
| 9,505,321 B2 | 11/2016 | Mazar | |
| 9,586,316 B1 * | 3/2017 | Swilling | B62D 57/032 |
| 9,827,678 B1 * | 11/2017 | Gilbertson | B25J 18/025 |
| 9,840,007 B1 * | 12/2017 | Kuffner | G06F 30/20 |
| 9,987,745 B1 * | 6/2018 | Berard | B25J 9/1661 |
| 10,035,437 B1 * | 7/2018 | Ballard | B60N 2/879 |
| 10,059,392 B1 * | 8/2018 | Fay | B25J 9/16 |
| 10,279,482 B1 * | 5/2019 | Khripin | B25J 9/20 |
| 10,787,316 B2 * | 9/2020 | Bonner | B66F 9/063 |
| 2009/0009124 A1 * | 1/2009 | Suga | B62D 57/032 318/568.12 |
| 2009/0260472 A1 * | 10/2009 | Suga | B62D 57/032 74/490.05 |
| 2010/0000365 A1 * | 1/2010 | Ogawa | B62D 57/032 74/490.05 |
| 2011/0231050 A1 * | 9/2011 | Goulding | B62D 57/032 701/26 |
| 2016/0052574 A1 * | 2/2016 | Khripin | B25J 9/1664 700/245 |
| 2016/0158932 A1 * | 6/2016 | Wyrobek | B25J 19/0016 180/21 |
| 2016/0319513 A1 * | 11/2016 | Chen | E02F 9/12 |
| 2017/0056262 A1 * | 3/2017 | Yamada | A61G 7/1038 |
| 2017/0258665 A1 * | 9/2017 | Maekawa | B62B 5/00 |
| 2018/0036185 A1 * | 2/2018 | Han | A61G 5/068 |
| 2019/0015273 A1 * | 1/2019 | Linon | A61G 5/061 |
| 2019/0104496 A1 * | 4/2019 | Sogo | G05D 1/0022 |
| 2020/0034514 A1 * | 1/2020 | Anderson | G06N 7/005 |
| 2020/0302207 A1 * | 9/2020 | Perkins | B25J 9/1697 |
| 2020/0324813 A1 * | 10/2020 | Hsu | B60K 7/0007 |

* cited by examiner

WALKING INFANT SEAT

TECHNICAL FIELD

The subject matter disclosed herein relates to infant seats for vehicle and, more particularly, to an infant seat that is removeably positioned within a vehicle.

BACKGROUND

Infant seats are used within a vehicle accommodate children that are too small for the adult seats within the vehicle. Typically such infant seats attach to a seat belt for the adult seat or specially designed attachment points such as a lower attachments and tethers for children (LATCH) system. Some infant seats are designed as infant carriers and include a handle for removing a portion of the infant seat with the child. Such seats may be placed on or attached to a stroller as part of a travel system.

One issue with such infant seats and carriers is weight and maneuverability. Such infant seats are typically constructed of rigid materials for protecting the child in the event of a collision. As such, the weight of an infant carrier may be significant. Additionally, safety recommendations advise using such rear facing infant seats as long as possible, so a growing child may add significant weight. Accordingly, the combination of infant carrier and child may be difficult for some people to maneuver in and out of a vehicle.

In view of the foregoing, an infant seat that is easier to load into and remove from a vehicle may be desirable. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides an infant seat. The infant seat may include a base including a shell enclosing a seating area and an infant restraint harness. The infant seat may include four legs, each pivotably mounted to the base, wherein each leg includes a joint between an upper segment and a lower segment allowing the leg to bend between a straight configuration and a folded configuration. The infant seat may include a first actuator for each leg coupled with the base and the respective upper segment and configured to pivot the leg with respect to the base. The infant seat may include a second actuator for each leg coupled with the upper segment and the lower segment and configured to bend and extend the leg at the joint. The infant seat may include a control system configured to translate an input command into a series of control signals for each of the first actuators and second actuators.

In an aspect, the control system includes a program to generate the series of control signals to: starting from a retracted state with each of the legs in the folded configuration, extend each leg at least partially to raise the shell; and alternatingly bend and extend the joints to walk the infant vehicle seat out of a vehicle.

In an aspect, the control system includes a program to generate the series of control signals to: starting from an extended state with each of the legs in the extended configuration, alternatingly bend and extend the joints to walk the infant vehicle seat to a vehicle entrance; walk the infant vehicle seat into the vehicle; and position the infant vehicle seat at a designated mounting location within the vehicle in the retracted state with each of the legs in the folded configuration.

In an aspect, the control system includes a machine learning model trained to maintain the shell in a level orientation.

In an aspect, each leg further includes a linear actuator configured to extend a length of the lower segment of the respective leg.

In an aspect, the shell is detachable from the base.

In an aspect, the base allows horizontal and vertical pivoting of each leg.

In an aspect, the infant seat may include a holographic display configured to present a hologram and receive the input command based on a user interaction with the hologram. In another aspect, the disclosure provides a method of operating a robotic infant seat including four legs, each pivotably mounted to the base, wherein each leg includes a joint between an upper segment and a lower segment allowing the leg to bend between a straight configuration and a folded configuration. The method may include providing measurements from one or more sensors to a machine learning model trained to maintain the base in a level orientation. The method may include generating, by the machine learning model, first control signals for respective actuators located in each of the legs. The method may include controlling the respective actuators according to the first control signals.

In another aspect, the disclosure provides a robotic infant seat control system including a memory storing executable instructions and a processor communicatively coupled to the memory and configured to execute the instructions to provide measurements from one or more sensors to a machine learning model trained to maintain the base in a level orientation. The processor may execute the instructions to generate, by the machine learning model, first control signals for respective actuators located in each of the legs. The processor may execute the instructions to control the respective actuators according to the first control signals.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
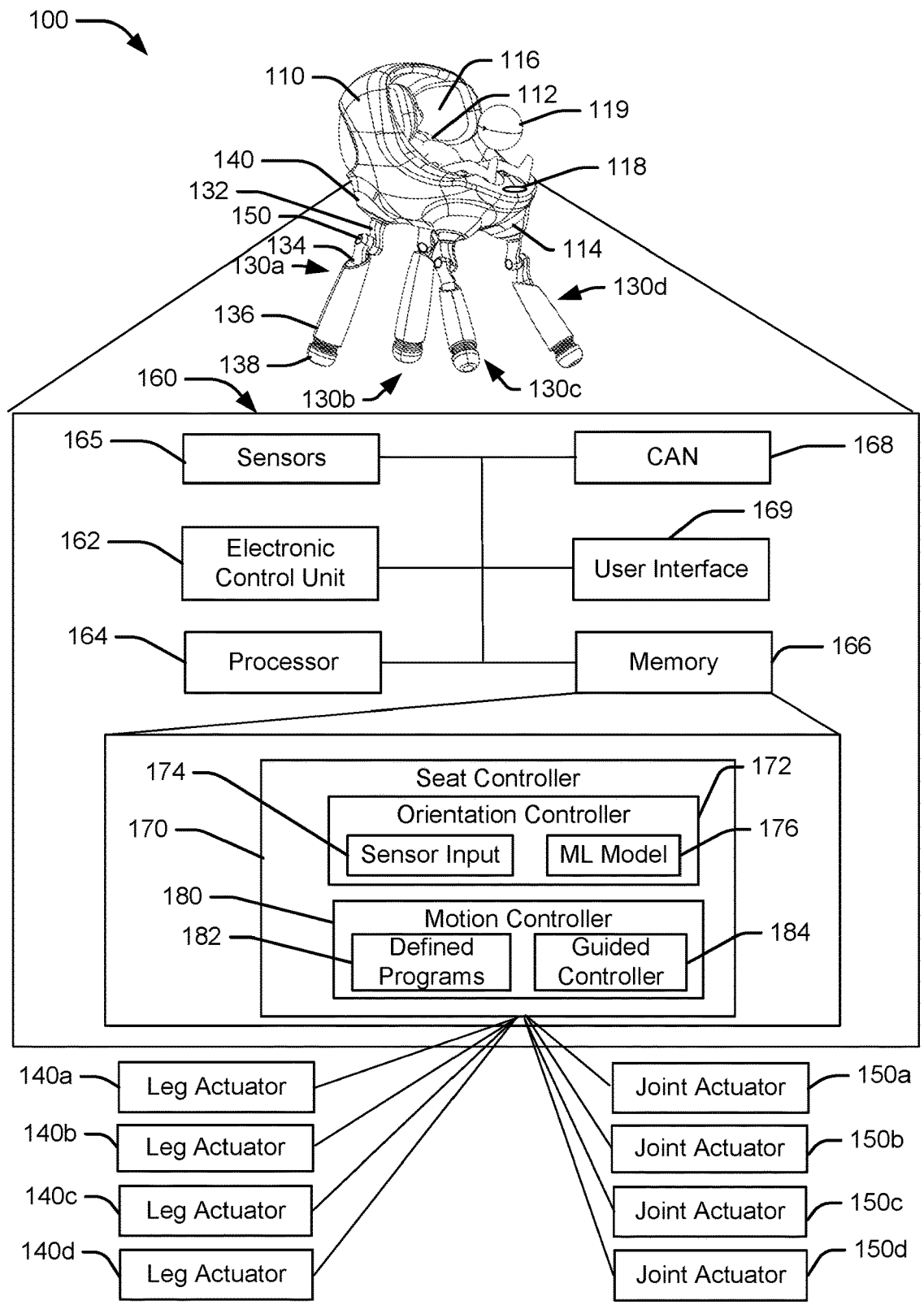
FIG. 1 illustrates a schematic view of an example infant seat in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

The term "graphical user interface," "GUI," or "user interface," as used herein, can refer to a type of interface that allows users to interact with electronic devices, the vehicle system, the vehicle, vehicle applications or the like, through graphical icons, visual indicators such as secondary notation, text-based, type command labels, text navigation, and the like.

The term "screen," "display screen," or "display," as used herein, can refer to a surface area upon which text, graphics and video are temporarily made to appear for human viewing. These may include, but are not limited to, eidophor, electroluminescent display ("ELD"), electronic paper, e-Ink, gyricon, light emitting diode display ("LED"), cathode ray tube ("CRT"), liquid-crystal display ("LCD"), plasma display panel ("PDP"), digital light processing ("DLP"), and the like.

In an aspect, the present disclosure provides an infant seat with robotic legs. The infant seat may include a control system that controls the robotic legs to at least move the infant seat from a docked travel position within the vehicle to a location outside of the vehicle. The control system may also control the robotic legs to move the infant seat from outside of the vehicle to the docked travel position.

The robotic legs may be pivotably connected a base, which may be attached to a shell including a child seating area and a child restraint system. In an aspect, the control system may include a trained machine-learning model configured to maintain a level orientation of the shell when the robotic legs are moving the infant seat.

Turning to FIG. 1, an example infant seat 100 is schematically illustrated. The infant seat 100 may include a central base 114 that pivotably couples four legs 130 (130*a*, 130*b*, 130*c*, 130*d*). The central base 114 may support a shell 110 that at least partially surrounds a child seating area 116. The shell 110 may include a child restraint 112 such as a harness or belts.

In an aspect, the legs 130 of the infant seat 100 may be electric robotic legs. Each leg 130 may include an upper segment 132 and a lower segment 134. In an aspect, the lower segment 134 may include a telescoping portion 136 and a foot 138. The upper segment 132 may be pivotably coupled to the base 114 and a leg actuator 140. For example, the leg actuator 140 may be rotational actuator (e.g., a motor) that couples the upper segment 132 to the base 114. As another example, the upper segment 132 may be coupled to the base 114 via a hinge, and the leg actuator 140 may be a linear actuator that controls an angle between the upper segment 132 and the base 114. In an aspect, pairs of legs (e.g., leg 130*a* and 130*b*) may be coupled within base 114 by a bar (not shown) that rotates each of the pair of legs about a vertical axis. The base 114 may include another actuator (not shown) for moving the bar. Accordingly, in an aspect, at least one pair of legs 130 may be turned. Similarly, the lower segment 134 may be pivotably coupled to the upper segment 132 and a joint actuator 150, which may be a rotational actuator or a linear actuator. The telescoping portion 136 may slide with respect to the lower segment 134 in a telescoping manner, either internally or externally. A linear actuator (not shown) may be located within the telescoping portion 136 and lower segment 134 to control the sliding. The foot 138 may be a generally flat surface coupled to the lower segment 134 via, for example, a ball and socket that allows the foot 138 to contact a surface without changing an angle of the leg 130.

The central base 114 may include a power source such as a battery or fuel cell. The power source may provide electric current for controlling actuators that move the legs 130. The infant seat 100 may include a control system 160 that controls power distribution and control signals.

The example infant seat 100 may include a rotary suspension including the four legs 130*a*, 130*b*, 130*c*, 130*d*. Each leg 130 may pivot vertically with respect to the central base 114. The pivots may be biased to rotate the legs in a downward direction. That is, the forward legs 130*a*, 130*b* may be biased to rotate counter-clockwise when viewed from the outside, and the rear legs 130*c*, 130*d* may be biased to rotate clockwise when viewed from the outside. In an aspect, the biasing force may be supplied, adjusted, and/or varied electronically by the control system 160. For example, each pivot may include an electromagnetic actuator that biases the respective leg downward. The biasing force (e.g., a variable downward force) may be adjusted for the weight of the shell 110 and the child. Additionally, in an aspect, the biasing force may be dynamically adapted to move an upper segment 132 of the leg in a walking pattern.

The control system 160 may reside within the infant seat 100. The components of the control system 160, as well as the components of other systems, hardware architectures, and software architectures discussed herein, may be combined, omitted or organized into various implementations.

The control system 160 may generally include an electronic control unit (ECU) 112 that operably controls a plurality of electronic systems. The electronic systems may include, but are not limited to an orientation system and a motion system, and the like. The control system 160 may also include a processor 164 and a memory 166 that communicate with the ECU 162, and controller area network (CAN) 168. The control system 160 may include one or more sensors 165 that determine information about the infant seat 100. For example, the sensors 165 may include cameras, accelerometers, and radar or lidar sensors. The sensors 165 may be located either on the infant seat 100 or within a vehicle associated with the infant seat 100. The control system 160 may also include a user interface 169 that may receive user input such as an input command from an operator and display information such as a current battery charge. The user interface 169 may be physically located on the infant seat 100, or may be remotely located (e.g., in a vehicle) and wirelessly transmit commands to the infant seat 100. In an aspect, the user interface 169 includes a holographic display 118 that projects a hologram 119. For example, the holographic display 118 may be located in the base 114 and project the hologram 119 to a location visible to a child in the seating area 116 as well as to an operator (e.g., a parent) near the infant seat 100. The holographic display 118 may also include a speaker and microphone. The hologram 119 may be perceived as a user interface for the infant seat 100. For example, the hologram 119 may be an image of a character that is synchronized with voice output from the speaker. The operator may provide voice commands to the microphone, for example, prefaced with a wake word associated with the character. In another aspect, the holographic display 118 may include a camera positioned to monitor interaction with the hologram. For example, the camera may detect the operator touching the hologram. In an aspect, the hologram 119 may be an image of the infant seat 100. The operator may provide an input command by interacting with the hologram, for example, by touching a leg portion of the image to indicate which leg to move. The holographic display 118 may also present entertainment programming to the child.

The ECU 162 may include internal processing memory, an interface circuit, and bus lines for transferring data, sending commands, and communicating with the vehicle systems. The ECU 162 may include an internal processor and memory, not shown. The infant seat 100 may also include a bus for sending data internally among the various components of the control system 160.

The memory 166 may store instructions executable by the processor 164 for carrying out the methods described herein. Further, the memory 166 may store parameters for carrying out the methods described herein. For example, the memory 166 may store a seat controller 170, which may include software executable by the processor 164 for operating the control system 160. The seat controller 170 may also include an orientation controller 172 for monitoring and controlling an orientation of the shell 110 and a motion controller 180 for controlling movement of the legs 130.

In an aspect, the orientation controller 172 may receive a sensor input 174 from the sensors 165 that determines an orientation of the base 114 and/or shell 110. For example, the sensor input 174 may include an orientation from one or more accelerometers that determine whether the base 114 is level or a deviation from a horizontal orientation. The orientation controller 172 may also include a machine-learning (ML) model 176. The ML model 176 may be trained to keep the base 114 and/or shell 110 level at all times. For example, the ML model 176 may be trained using reinforcement learning to reward level conditions and punish tilting or falling. Accordingly, the ML model 176 may "learn" to anticipate and respond to forces exerted on the base 114 and/or shell 110 by gravity, momentum, and the legs 130. In an aspect, the ML model 176 may be trained on an example infant seat 100 and transferred to other infant seats having the same hardware configuration.

The motion controller 180 may generate control signals for each of the leg actuators 140 and the joint actuators 150 based on a command from the user interface 169. In an aspect, the motion controller 180 may include one or more defined programs 182 that cause the motion controller 180 to generate a series of control signals for performing a particular movement. For example, a vehicle exit routine and a vehicle entry routine may include the same movements each time the routine is performed with respect to a vehicle. Such routines may also include specific movements that are unlikely in other scenarios (e.g., walking along a flat surface). For example, an exit routine may include extending one pair of legs 130 to contact a floor of the vehicle while the other pair of legs 130 remains folded on to mounting position. In an aspect, the defined programs 182 may be interrupted and/or paused based on input from the user interface 169 or sensors 165, for example, to remove a blocking object.

The motion controller 180 may also include a guided controller 184 that may perform movements based on input from a user. For example, the user interface 169 may allow the user to select one of forward movement, backward movement, clockwise turning, or counter-clockwise turning. The guided controller 184 may generate control signals for performing the selected movement subject to input from sensors.

Figure 2:
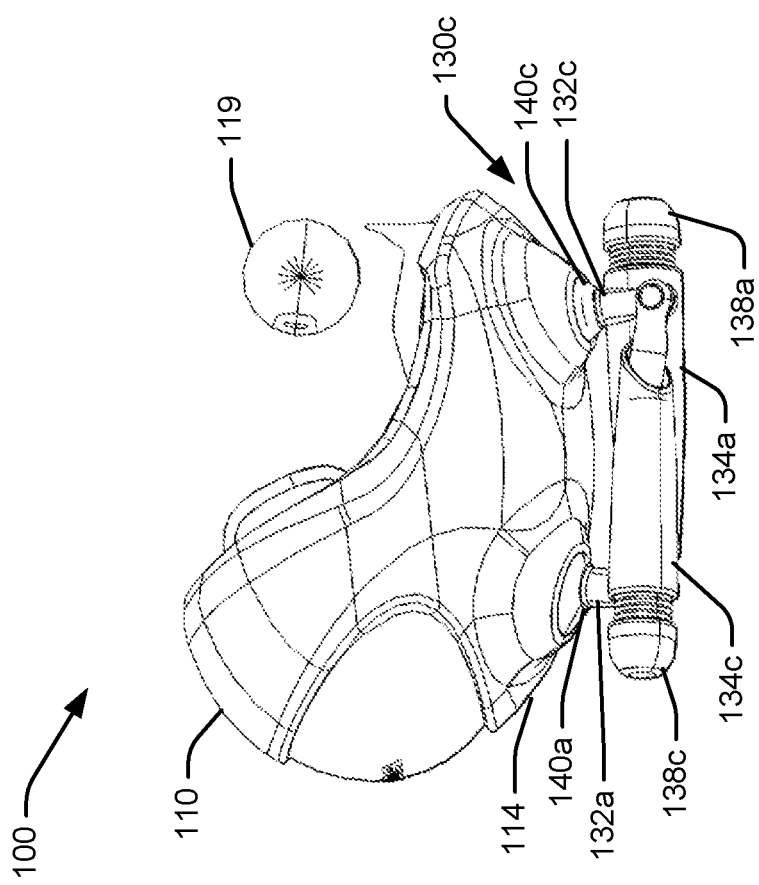
FIG. 2 illustrates a side view of the example infant seat in accordance with aspects of the present disclosure.

FIG. 2 illustrates side view of the example infant seat 100 in a retracted state. A front leg 130a may be bent at the actuator 140a such that the top segment 132a extends rearward and bent at the joint actuator 150a such that the bottom segment 134a extends forward. In contrast, the rear leg 130c may be bent at the actuator 140c such that the top segment 132c extends forward and bent at the joint actuator 150c such that the bottom segment 134c extends rearward.

Figure 3:
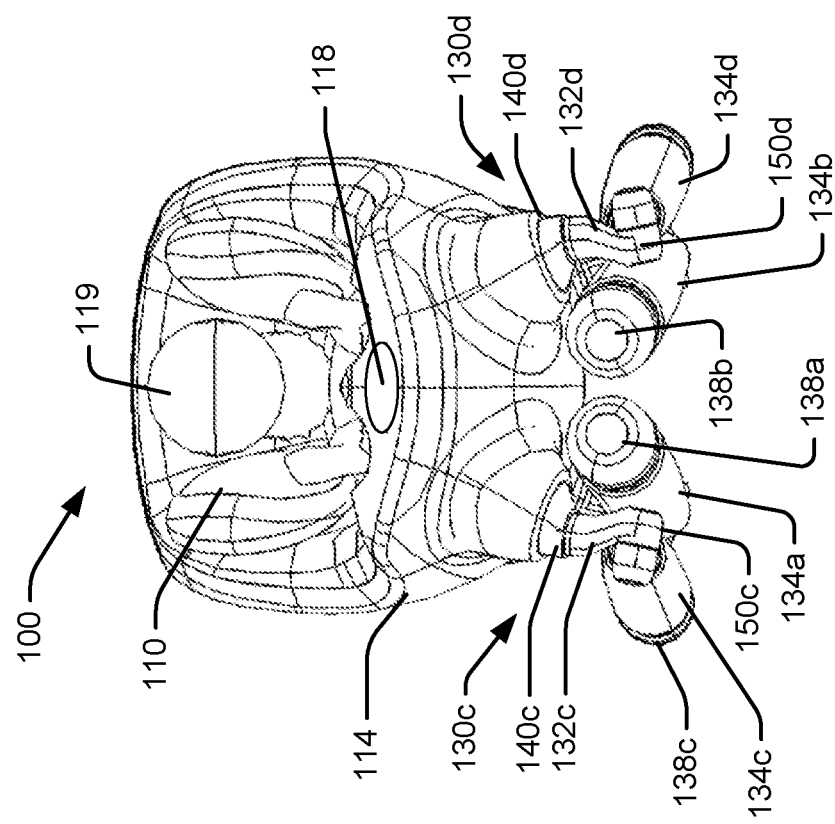
FIG. 3 illustrates a back view of the example infant seat, in accordance with aspects of the present disclosure.

FIG. 3 illustrates a rear view of the example infant seat 100 in the retracted state. In an aspect, the rear legs 130c and 130d may be angled outward while the front legs 130a and 130b are angled inward to fold beneath the base. Such an arrangement may provide space for all of the legs with a minimum height of the base 114. It should be appreciated that other arrangements of the legs in a retracted state may be selected. The infant seat 100 may fold into the retracted state when positioned at a docked travel position within a vehicle. The docked travel position may be, for example, on top of a seat or in a space between seats. The infant seat 100 may be secured in the docked travel position, for example, using a seat belt or a LATCH system. In an aspect, the legs 130 may secure the infant seat 100 within the vehicle. For example, the legs 130 may include a feature (e.g., a loop or hook) that engages with a corresponding feature at the docked travel position. In an aspect, a vehicle entry program may cause the infant seat 100 to position itself at the docked travel position and engage the securing features without user intervention.

Figure 4:
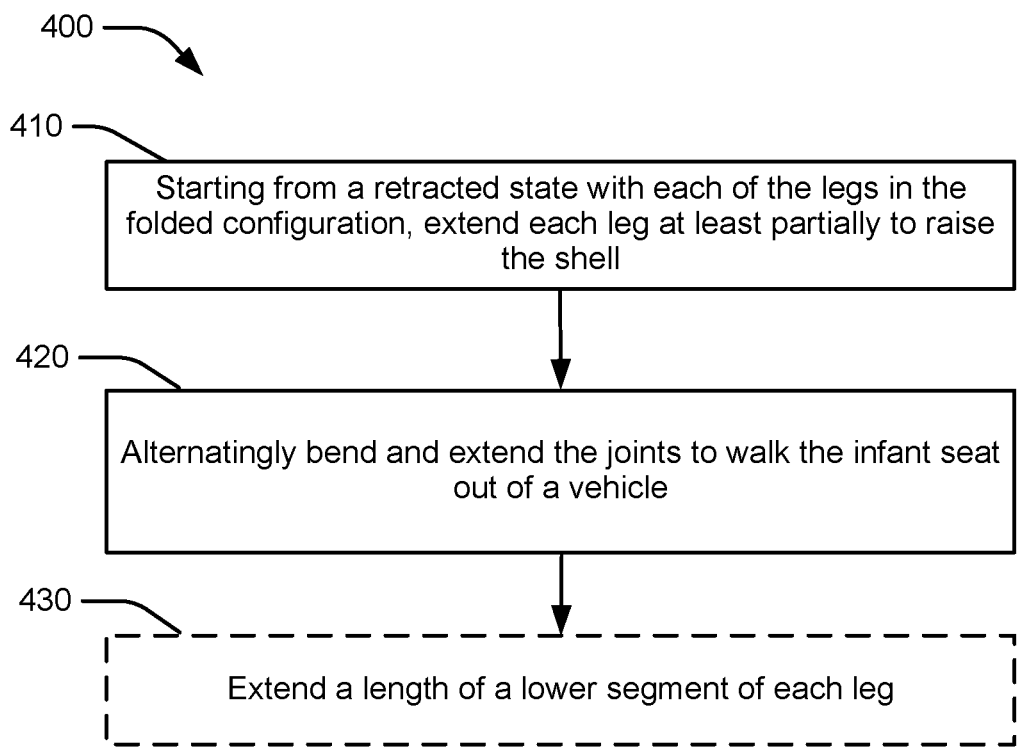
FIG. 4 is a flowchart of an example method of controlling an infant seat to exit a vehicle in accordance with aspects of the present disclosure.

FIG. 4 illustrates a flowchart of an example method 400 for controlling an infant seat to exit a vehicle. The method 400 may be performed by a seat controller 170 in communication with other components of the control system 160 within the infant seat 100 or an associated vehicle.

In block 410, the method 400 may include starting from a retracted state with each of the legs in the folded configuration, extending each leg at least partially to raise the shell. In an aspect, for example, the motion controller 180 may execute a defined program 182 to extend each leg 130 at least partially to raise the shell 110.

In block 420, the method 400 may include alternatingly bending and extending the joints to walk the infant seat out of a vehicle. In an aspect, for example, the motion controller 180 may generate a control signal for each of the leg actuators 140 and the joint actuators 150 to alternatingly bend and extend the joints to walk the infant seat 100 out of a vehicle. In an aspect, for example, the motion controller 180 may generate signals to control one leg 130 at a time. The infant seat may remain balanced on the other three legs while the one leg 130 is moving.

In block 430, the method 400 may optionally include extending a length of a lower segment of each leg. In an aspect, for example, the motion controller 180 may generate a control signal to extend the telescoping portion 136 from the lower segment 134.

Figure 5:
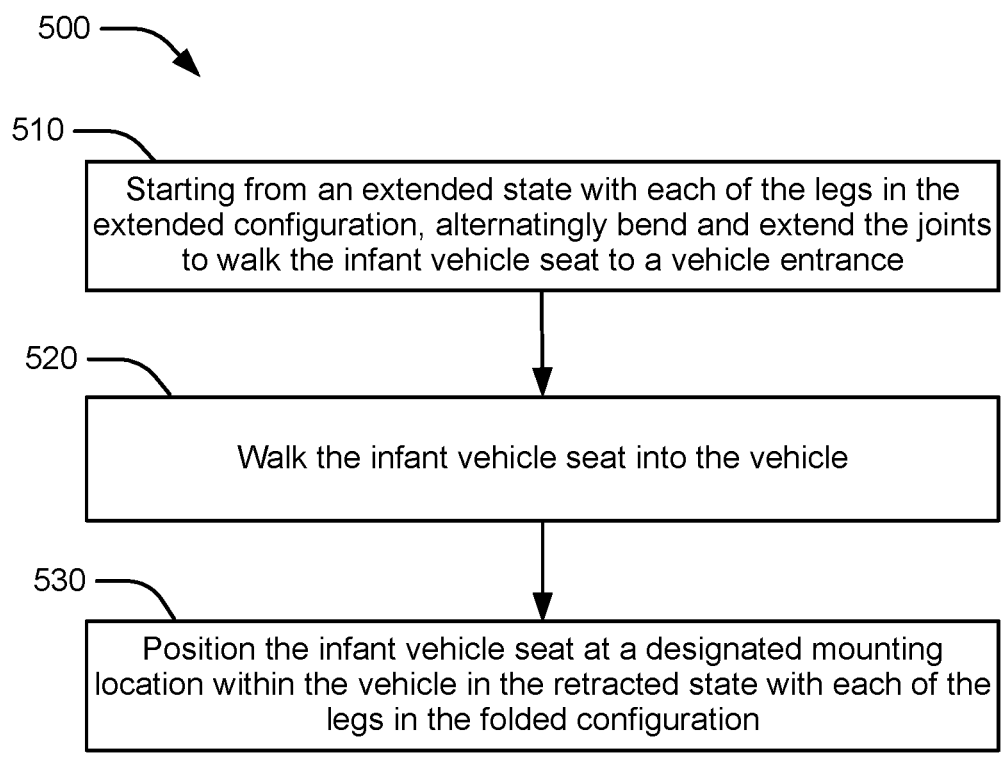
FIG. 5 is a flowchart of an example method of controlling an infant seat to enter a vehicle in accordance with aspects of the present disclosure.

FIG. 5 illustrates a flowchart of an example method 500 for controlling an infant seat to enter a vehicle. The method 500 may be performed by a seat controller 170 in communication with other components of the control system 160 within the infant seat 100 or an associated vehicle.

In block 510, the method 500 may include starting from an extended state with each of the legs in the extended configuration, alternatingly bending and extending the joints to walk the infant vehicle seat to a vehicle entrance. For example, the motion controller 180 may generate a control signal for each of the leg actuators 140 and the joint actuators 150 to alternatingly bend and extend the joints to walk the infant seat 100 to a vehicle entrance. In an aspect, for example, the motion controller 180 may generate signals to control one leg 130 at a time. The infant seat may remain balanced on the other three legs while the one leg 130 is moving.

In block 520, the method 500 may include walking the infant vehicle seat into the vehicle. For example, the motion controller 180 may generate a control signal for each of the leg actuators 140 and the joint actuators 150 to move the leg from an outside surface to a vehicle floor. In an aspect, walking the infant vehicle seat into the vehicle may include moving each foot 138 to a designated spot within the vehicle.

In block 530, the method 500 may include positioning the infant seat at a designated mounting location within the vehicle in the retracted state with each of the legs in the folded configuration. In an aspect, for example, the motion controller 180 may generate a control signal for each of the leg actuators 140 and the joint actuators 150 to position the infant seat at the designated mounting location within the vehicle in the retracted state with each of the legs in the folded configuration as illustrated in FIG. 2 and FIG. 3. Positioning the infant seat at the designated mounting location may include positioning one or more of the feet 138 at a specific defined location and then bending the leg to the folded configuration.

Figure 6:
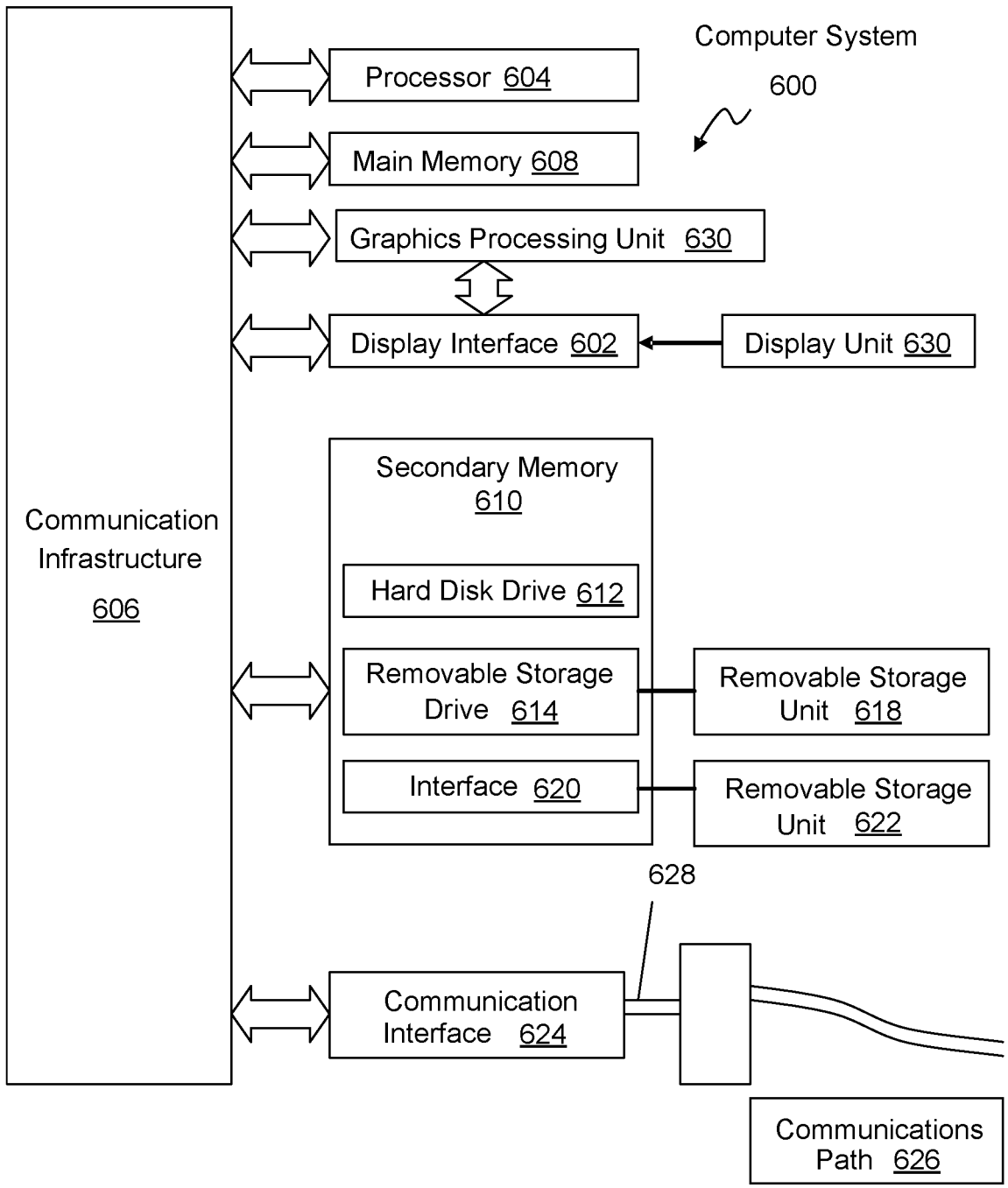
FIG. 6 presents an exemplary system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. For example, the computer system may implement the seat controller 170. FIG. 6 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 600 may include a display interface 602 that forwards graphics, text, and other data from the communication infrastructure 606 (or from a frame buffer not shown) for display on a display unit 630. In an aspect, the display unit 630 may correspond to the user interface 169. Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 614, a hard disk installed in hard disk drive 612, and signals 628. These computer program products provide software to the computer system 600. Aspects of the disclosure are directed to such computer program products.

Computer programs (also referred to as computer control logic) are stored in main memory 608 and/or secondary memory 610. Computer programs may also be received via communications interface 624. Such computer programs, when executed, enable the computer system 600 to perform various features in accordance with aspects of the present disclosure, as discussed herein. In particular, the computer programs, when executed, enable the processor 604 to perform such features. Accordingly, such computer programs represent controllers of the computer system 600.

In variations where aspects of the disclosure are implemented using software, the software may be stored in a computer program product and loaded into computer system 600 using removable storage drive 614, hard disk drive 612, or communications interface 620. The control logic (software), when executed by the processor 604, causes the processor 604 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 7:
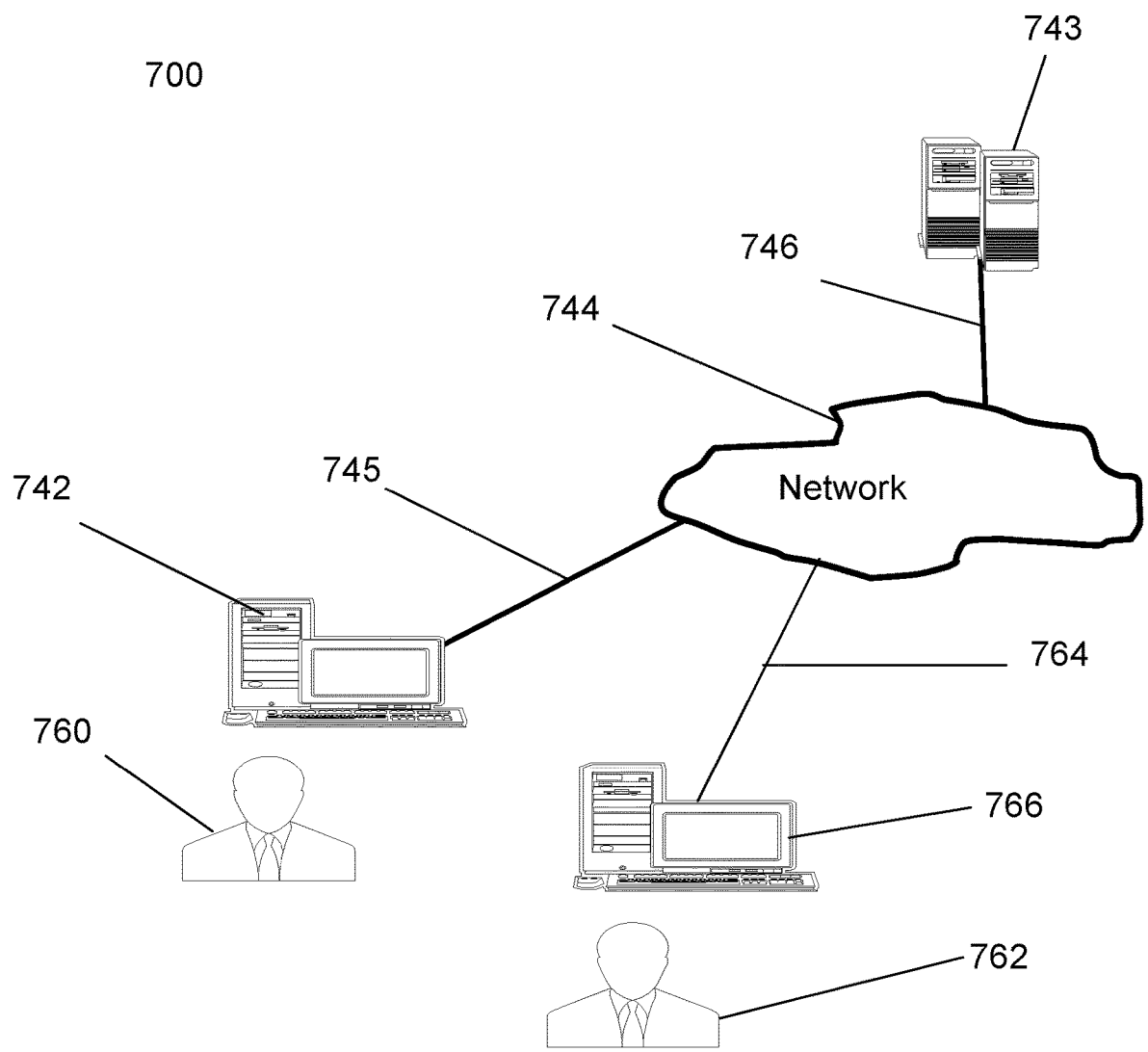
FIG. 7 is a block diagram of various exemplary system components for use in accordance with aspects of the present disclosure.

FIG. 7 is a block diagram of various example system components that may be used in accordance with aspects of the present disclosure. For example, the various components may be within the infant seat 100, or only some of the components may be within the infant seat 100, and other components may be remote from the infant seat 100 (e.g., in an associated vehicle). The system 700 includes one or more accessors 760, 762 (also referred to interchangeably herein as one or more "users") and one or more terminals 742, 766 (such terminals may be or include, for example, various features of the control system 160). In one aspect, data for use in accordance with aspects of the present disclosure is, for example, input and/or accessed by accessors 760, 762 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An infant vehicle seat, comprising:
   a base including a shell enclosing a seating area and an infant restraint harness;
   four legs, each pivotably mounted to the base, wherein each leg includes a joint between an upper segment and a lower segment allowing the leg to bend between a straight configuration and a folded configuration;
   a first actuator for each leg coupled with the base and the respective upper segment and configured to pivot the leg with respect to the base;
   a second actuator for each leg coupled with the upper segment and the lower segment and configured to bend and extend the leg at the joint; and
   a control system configured to translate an input command into a series of control signals for each of the first actuators and second actuators.

2. The infant vehicle seat of claim 1, wherein the control system includes a program to generate the series of control signals to:
   starting from a retracted state with each of the legs in the folded configuration, extend each leg at least partially to raise the shell; and
   alternatingly bend and extend the joints to walk the infant vehicle seat out of a vehicle.

3. The infant vehicle seat of claim 1, wherein the control system includes a program to generate the series of control signals to:
   starting from an extended state with each of the legs in the straight configuration, alternatingly bend and extend the joints to walk the infant vehicle seat to a vehicle entrance;
   walk the infant vehicle seat into the vehicle; and
   position the infant vehicle seat at a designated mounting location within the vehicle in a retracted state with each of the legs in the folded configuration.

4. The infant vehicle seat of claim 1, wherein the control system includes a machine learning model trained to maintain the shell in a level orientation.

5. The infant vehicle seat of claim 1, wherein each leg further includes a linear actuator configured to extend a length of the lower segment of the respective leg.

6. The infant vehicle seat of claim 1, wherein the shell is detachable from the base.

7. The infant vehicle seat of claim 1, wherein the base allows horizontal and vertical pivoting of each leg.

8. The infant vehicle seat of claim 1, further comprising a holographic display configured to present a hologram and receive the input command based on a user interaction with the hologram.

9. A method of operating a robotic infant vehicle seat including four legs, each pivotably mounted to a base, wherein each leg includes a joint between an upper segment and a lower segment allowing the leg to bend between a straight configuration and a folded configuration, comprising:
providing measurements from one or more sensors to a machine learning model trained to maintain the base in a level orientation;
generating, by the machine learning model, first control signals for respective actuators located in each of the legs; and
controlling the respective actuators according to the first control signals.

10. The method of claim 9, wherein the respective actuators located in each of the legs include:
a first actuator for each leg coupled with the base and the respective upper segment and configured to pivot the leg with respect to the base; and
a second actuator for each leg coupled with the upper segment and the lower segment and configured to bend and extend the leg at the joint.

11. The method of claim 9, further comprising:
receiving a user input to move the infant seat; and
executing a program to generate second control signals to move the infant seat according to the user input; and
controlling the respective actuators according to the second control signals in addition to the first control signals.

12. The method of claim 11, wherein the program generates the second control signals to:
starting from a retracted state with each of the legs in the folded configuration, extend each leg at least partially to raise the base; and
alternatingly bend and extend the joints to walk the infant vehicle seat out of a vehicle.

13. The method of claim 11, wherein the program generates the second control signals to:
starting from an extended state with each of the legs in the straight configuration, alternatingly bend and extend the joints to walk the infant vehicle seat to a vehicle entrance;
walk the infant vehicle seat into the vehicle; and
position the infant vehicle seat at a designated mounting location within the vehicle in a retracted state with each of the legs in the folded configuration.

14. The method of claim 11, further comprising projecting a hologram via a holographic display located within the base, wherein receiving the user input to move the infant seat comprises receiving an input command based on a user interaction with the hologram.

15. A robotic infant seat control system, comprising:
a memory;
a processor communicatively coupled to the memory and configured to:
provide measurements from one or more sensors to a machine learning model trained to maintain a base of the robotic infant seat in a level orientation;
generate, by the machine learning model, first control signals for respective actuators located in each leg of the robotic infant seat; and
control the respective actuators according to the first control signals.

16. The robotic infant seat control system of claim 15, wherein the respective actuators located in each leg include:
a first actuator for each leg coupled with the base and a respective upper segment and configured to pivot the leg with respect to the base; and
a second actuator for each leg coupled with the respective upper segment and a respective lower segment and configured to bend and extend the leg at a joint.

17. The robotic infant seat control system of claim 15, wherein the processor is configured to:
receive a user input to move the infant seat; and
execute a program to generate second control signals to move the infant seat according to the user input; and
control the respective actuators according to the second control signals in addition to the first control signals.

18. The robotic infant seat control system of claim 17, wherein the program generates the second control signals to:
starting from a retracted state with each leg in a folded configuration, extend each leg at least partially to raise the base; and
alternatingly bend and extend joints in the legs to walk the robotic infant seat out of a vehicle.

19. The robotic infant seat control system of claim 17, wherein the program generates the second control signals to:
starting from an extended state with each leg in a straight configuration, alternatingly bend and extend respective joints of the legs to walk the robotic infant seat to a vehicle entrance;
walk the robotic infant seat into the vehicle; and
position the infant vehicle seat at a designated mounting location within the vehicle in a retracted state with each of the legs in a folded configuration.

20. The robotic infant seat control system of claim 17, wherein the processor is configured to:
project a hologram via a holographic display located within the base; and
receive the user input to move the infant seat as an input command based on a user interaction with the hologram.

* * * * *